(12) United States Patent
Riva et al.

(10) Patent No.: US 10,257,342 B2
(45) Date of Patent: *Apr. 9, 2019

(54) VALIDATING STATEFUL DYNAMIC LINKS IN MOBILE APPLICATIONS

(71) Applicant: Microsoft Technology Licensing, LLC, Redmond, WA (US)

(72) Inventors: Oriana Riva, Redmond, WA (US); Suman Kumar Nath, Redmond, WA (US); Md Tanzirul Azim, Riverside, CA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/088,028

(22) Filed: Mar. 31, 2016

(65) Prior Publication Data

US 2017/0289339 A1 Oct. 5, 2017

(51) Int. Cl.
*H04L 29/08* (2006.01)
*H04M 1/725* (2006.01)
*H04W 12/02* (2009.01)
*G06F 9/48* (2006.01)

(52) U.S. Cl.
CPC ........ *H04M 1/72561* (2013.01); *G06F 9/485* (2013.01); *G06F 9/4843* (2013.01); *H04L 67/02* (2013.01); *H04L 67/025* (2013.01); *H04L 67/04* (2013.01); *H04L 67/10* (2013.01); *H04W 12/02* (2013.01)

(58) Field of Classification Search
CPC .. G06F 8/34; G06F 8/71; G06F 9/461; G06Q 10/107; G06T 1/20; H03M 7/30; H04L 12/42; H04L 12/66; H04L 63/0263; H04L 67/02; H04L 67/025; H04L 67/04; H04L 67/10; H04W 4/00; H04W 12/02; H04M 1/72561
See application file for complete search history.

(56) References Cited

U.S. PATENT DOCUMENTS

| | | | |
|---|---|---|---|
| 7,761,917 B1* | 7/2010 | Kumar | ................ H04L 63/0263 726/23 |
| 8,209,615 B2 | 6/2012 | Gupta et al. | |
| 8,510,764 B1 | 8/2013 | Deselaers et al. | |
| 8,549,180 B2* | 10/2013 | Critchley | ................ H04L 12/42 709/251 |
| 9,047,147 B2 | 6/2015 | Francis | |
| 9,195,477 B1 | 11/2015 | Spencer | |
| 2003/0225891 A1 | 12/2003 | Stienhans | |

(Continued)

OTHER PUBLICATIONS

Android Developers, "Enabling Deep Links for App Content," 3 pages (accessed Mar. 23, 2016).

(Continued)

*Primary Examiner* — Le H Luu
(74) *Attorney, Agent, or Firm* — Klarquist Sparkman, LLP

(57) ABSTRACT

Techniques are described for validating stateful app links. Validation can be performed when stateful app links are created, activated, shared, or at other times. Validation can be performed to determine whether a stateful app link has a dependency on a resource external to the mobile application. Validation can also be performed to detect other issues, such as security issues, privacy issues, or other issues.

20 Claims, 12 Drawing Sheets

(56) References Cited

U.S. PATENT DOCUMENTS

| | | |
|---|---|---|
| 2004/0111488 A1 | 6/2004 | Allan |
| 2005/0004972 A1* | 1/2005 | Meskauskas ............ H03M 7/30 709/200 |
| 2006/0236302 A1* | 10/2006 | Bateman .................... G06F 8/34 717/104 |
| 2006/0248121 A1* | 11/2006 | Cacenco .................... G06F 8/71 |
| 2008/0195664 A1 | 8/2008 | Maharajh et al. |
| 2009/0222727 A1 | 9/2009 | George et al. |
| 2010/0179998 A1* | 7/2010 | Matteini .............. G06Q 10/107 709/206 |
| 2011/0078234 A1 | 3/2011 | Engel |
| 2012/0036003 A1 | 2/2012 | Tong et al. |
| 2012/0179955 A1 | 7/2012 | French et al. |
| 2013/0110815 A1 | 5/2013 | Tankovich et al. |
| 2014/0279530 A1 | 9/2014 | Douglas et al. |
| 2014/0366038 A1* | 12/2014 | McKeown .............. G06F 9/461 718/108 |
| 2015/0081764 A1 | 3/2015 | Zhao et al. |
| 2015/0154644 A1 | 6/2015 | Saxena et al. |
| 2015/0379128 A1 | 12/2015 | Chang |
| 2016/0094654 A1 | 3/2016 | Raman et al. |
| 2016/0095041 A1* | 3/2016 | Agrawal ................. H04W 4/00 370/332 |
| 2016/0112290 A1* | 4/2016 | Bakshi .................... H04L 12/66 455/425 |
| 2016/0266730 A1 | 9/2016 | Franke et al. |
| 2017/0186129 A1* | 6/2017 | Brabec ...................... G06T 1/20 |
| 2017/0289338 A1* | 10/2017 | Riva ........................ H04L 67/02 |

OTHER PUBLICATIONS

Anupam, et al., "Automating Web navigation with the WebVCR", In Proceedings of the 9th international World Wide Web conference on Computer networks, Jun. 2000, pp. 1-22.

"Apache Lucene", Retrieved on: Jan. 6, 2016, Available at: http://lucene.apache.org/, 15 pages.

"Appsee", Retrieved on: Jan. 6, 2016, Available at: https://www.appsee.com/, 8 pages.

Arzt, et al., "FlowDroid: precise context, flow, field, object-sensitive and lifecycle-aware taint analysis for Android apps", In Proceedings of the 35th ACM SIGPLAN Conference on Programming Language Design and Implementation, Jun. 9, 2014, pp. 259-269.

"dex2jar", Retrieved on: Jan. 6, 2016, Available at: https://github.com/pxb1988/dex2jar, 2 pages.

Dumais, et al., "Stuff I've Seen: A System for Personal Information Retrieval and Re-Use", In Proceedings of the 26th Annual International ACM SIGIR Conference on Research and Development in Information Retrieval, Jul. 28, 2003, 8 pages.

Dunlap, et al., "ReVirt: Enabling intrusion analysis through virtual-machine logging and replay", In Proceedings of the 5th symposium on Operating systems design and implementation, Dec. 2002, pp. 211-224.

"Enabling Deep Links for App Content", Retrieved on: Jan. 6, 2016, Available at: http://developer.android.com/training/app-indexing/deep-linking.html, 2 pages.

Enck, et al., "TaintDroid: an information-flow tracking system for realtime privacy monitoring on smartphones", In Proceedings of the 9th USENIX conference on Operating systems design and implementation, Oct. 2010, 15 pages.

Flinn, et al., "Can deterministic replay be an enabling tool for mobile computing?", In Proceedings of the 12th Workshop on Mobile Computing Systems and Applications, Mar. 1, 2011, pp. 84-89.

"Flurry", Retrieved on: Jan. 6, 2016, Available at: http://www.flurry.com/, 1 page.

Gomez, et al., "RERAN: timing- and touch-sensitive record and replay for Android", In Proceedings of the 2013 International Conference on Software Engineering, May 18, 2013, pp. 72-81.

Guo, et al., "R2: An Application level Kernel for Record and Replay", In Proceedings of the 8th USENIX conference on Operating systems design and implementation, Dec. 8, 2008, 16 pages.

Hao, et al., "PUMA: Programmable UI-Automation for Large Scale Dynamic Analysis of Mobile Apps", In Proceedings of the 12th annual international conference on Mobile systems, applications, and services, Jun. 16, 2014, 14 pages.

Hathiramani, Raj, "How Many of the Top 200 Mobile Apps Use Deeplinks?", Published on: Jul. 1, 2014, Available at: http://blog.urx.com/urx-blog/how-many-of-the-top-200-mobile-apps-use-deeplinks, 8 pages.

Hu, et al., "Versatile yet Lightweight Record-And-Replay for Android", In Proceedings of the ACM SIGPLAN International Conference on Object-Oriented Programming, Systems, Languages, and Applications, Oct. 25, 2015, pp. 976-993.

Hupp, et al., "Smart Bookmarks: Automatic Retroactive Macro Recording on the Web", In Proceedings of the 20th annual ACM symposium on User interface software and technology, Oct. 7, 2007, 10 pages.

"IFTTT", Retrieved on: Jan. 6, 2016, Available at: https://ifttt.com/recipes, 3 pages.

"Java Decompiler", Retrieved on: Jan. 6, 2016, Available at: http://jd.benow.ca/, 3 pages.

Kokalitcheva, Kia, "Imagine a web without URLs. That's what the mobile app world looks like now", Published on: Jul. 8, 2014, Available at: http://venturebeat.com/2014/07/08/imagine-a-web-without-urls-thats-what-the-mobile-app-world-looks-like-now/, 5 pages.

Leshed, et al., "CoScripter: Automating & sharing how-to knowledge in the enterprise", In Proceedings of the SIGCHI Conference on Human Factors in Computing Systems, Apr. 5, 2008, 10 pages.

Li, et al., "Here's What I Did: Sharing and Reusing Web Activity with Action Shot", In Proceedings of the SIGCHI Conference on Human Factors in Computing Systems, Apr. 10, 2010, 10 pages.

"Localytics", Retrieved on: Jan. 6, 2016, Available at: http://www.localytics.com/, 5 pages.

"Mobile.deep.linking", Published on: Feb. 28, 2014, Available at: http://mobiledeeplinking.org/, 12 pages.

Narayanasamy, et al., "BugNet: Continuously recording program execution for deterministic replay debugging", In Proceedings of the International Symposium on Computer Architecture, Jun. 2005, pp. 1-12.

Nath, et al., "SmartAds: Bringing Contextual Ads to Mobile Apps", In Proceeding of the 11th annual international conference on Mobile systems, applications, and services, Jun. 26, 2013, 13 pages.

Nightingale, et al., "Parallelizing security checks on commodity hardware", In Proceedings of ACM SIGPLAN Notices, vol. 43, Issue 3, Mar. 1, 2008, 11 pages.

Perez, Sarah, "Ready for a "Web" of Apps? Quixey Launches AppURL, A New Way to Enable Deep Linking Across Mobile", Published on: Aug. 2, 2013 Available at: http://techcrunch.com/2013/08/02/ready-for-a-web-of-apps-quixey-launches-appurl-a-new-way-to-enable-deep-linking-across-mobile-applications/, 7 pages.

Safonov, et al., "End-user web automation: Challenges, experiences, recommendations", In Proceedings of World Conference on the WWW and Internet, Oct. 23, 2001, 8 pages.

"Soot: A Framework for Analyzing and transforming Java and Android applications", Retrieved on: Jan. 6, 2016, Available at: http://sable.github.io/soot/, 2 pages.

Srinivasan, et al., "Flashback: A lightweight extension for rollback and deterministic replay for software debugging", In Proceedings of the annual conference on USENIX Annual Technical Conference, Jun. 27, 2004, 15 pages.

"SuSi—Sources and Sinks", Retrieved on: Jan. 6, 2016, Available at: http://developer.android.com/training/app-indexing/deep-linking.html, 3 pages.

Vallee-Rai, et al., "Soot—a Java Bytecode Optimization Framework", In Proceedings of the conference of the Centre for Advanced Studies on Collaborative research, Nov. 8, 1999, 11 pages.

Xu, et al., "A Flight Data Recorder for enabling full-system multiprocessor deterministic replay", In Proceedings of the 30th annual international symposium on Computer architecture, vol. 31, Issue 2, May 2003, 12 pages.

International Search Report and Written Opinion, International Application No. PCT/US2017/024398, 12 pages (dated Jun. 26, 2017).

(56) References Cited

OTHER PUBLICATIONS

"Final Office Action Issued in U.S. Appl. No. 15/087,973", dated May 3, 2018, 16 Pages.
"Non Final Office Action Issued in U.S. Appl. No. 15/087,973", dated Dec. 5, 2017, 16 Pages.
"International Search Report and Written Opinion Issued in PCT Application No. PCT/US2017/024389", dated Jul. 4, 2017, 11 Pages.
"Non Final Office Action Issued in U.S. Appl. No. 15/087,973", dated Jul. 31, 2018, 16 Pages.

* cited by examiner

FIG. 7
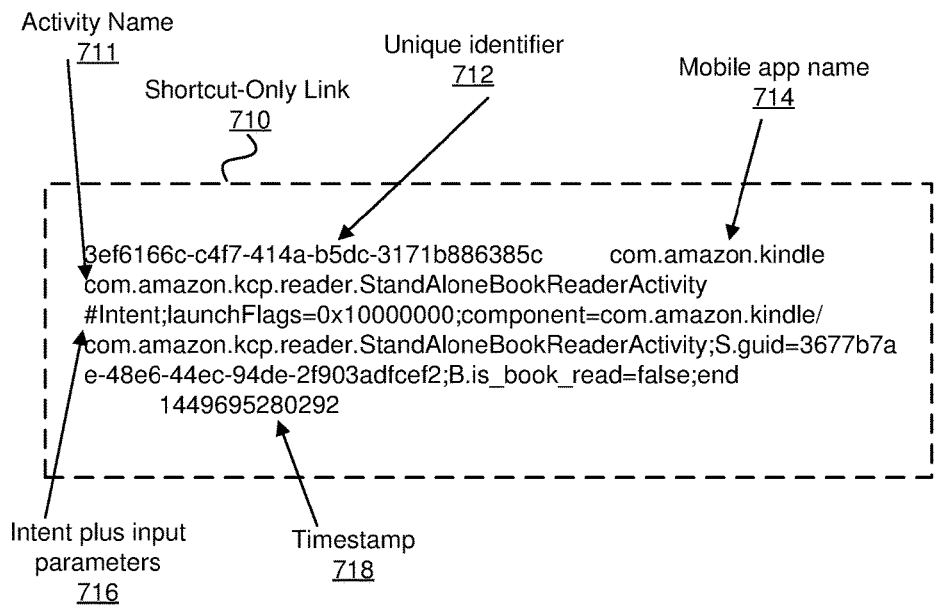
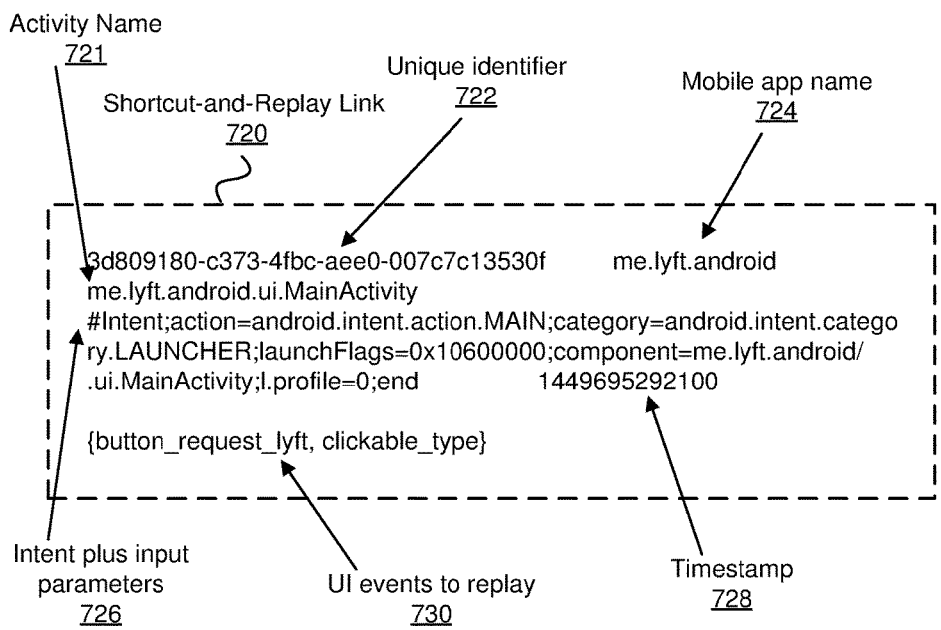

SOFTWARE 1180 IMPLEMENTING DESCRIBED TECHNOLOGIES

VALIDATING STATEFUL DYNAMIC LINKS IN MOBILE APPLICATIONS

BACKGROUND

In the web, deep linking refers to the use of hyperlinks that link to a specific web page (or other web content), other than the home page, on a website. Mobile deep links provide a similar experience for mobile apps. Mobile deep links point to a specific location in a mobile app. A mobile deep link can launch an app that is already installed on a user's mobile device or it can directly open a specific location within the app.

While mobile deep links can provide some of the functionality of web deep links, current mobile deep link technology has a number of significant limitations. For example, in order to support mobile deep links, a developer may be required to write code for each deep link to be supported by the app. In addition, such mobile deep links are statically defined and only support linking to the specific locations within the app that are defined by the developer. These limitations result in limited coverage (a small number of locations within an app, predefined by the developer, that are directly accessible by deep links).

Therefore, there exists ample opportunity for improvement in technologies related to deep linking in mobile applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for validating stateful app links for mobile applications. For example, a log of events triggered by a mobile application can be maintained. A request can be received to dynamically generate a stateful app link to a current page (or to a current view of the current page) of the mobile application. Validation can then be performed to determine whether the log contains an event associated with the current page that has a dependency on a resource external to the mobile application. An indication of the dependency can be out (e.g., a warning or error message). Validation can also be performed to check for security, privacy, and/or other issues.

Validation of stateful app links can be performed when sharing stateful app links. For example, a request can be received to share a stateful app link. In response to the request, validation can be performed. If the validation is successful, the stateful app link can be shared. If the validation is unsuccessful, then appropriate action can be taken (e.g., the sharing can be denied, a warning message can be presented, etc.).

As described herein, a variety of other features and advantages can be incorporated into the technologies as desired.

BRIEF DESCRIPTION OF THE DRAWINGS

FIG. 7 is a diagram depicting examples of stateful app links.

DETAILED DESCRIPTION

Overview

Figure 1:
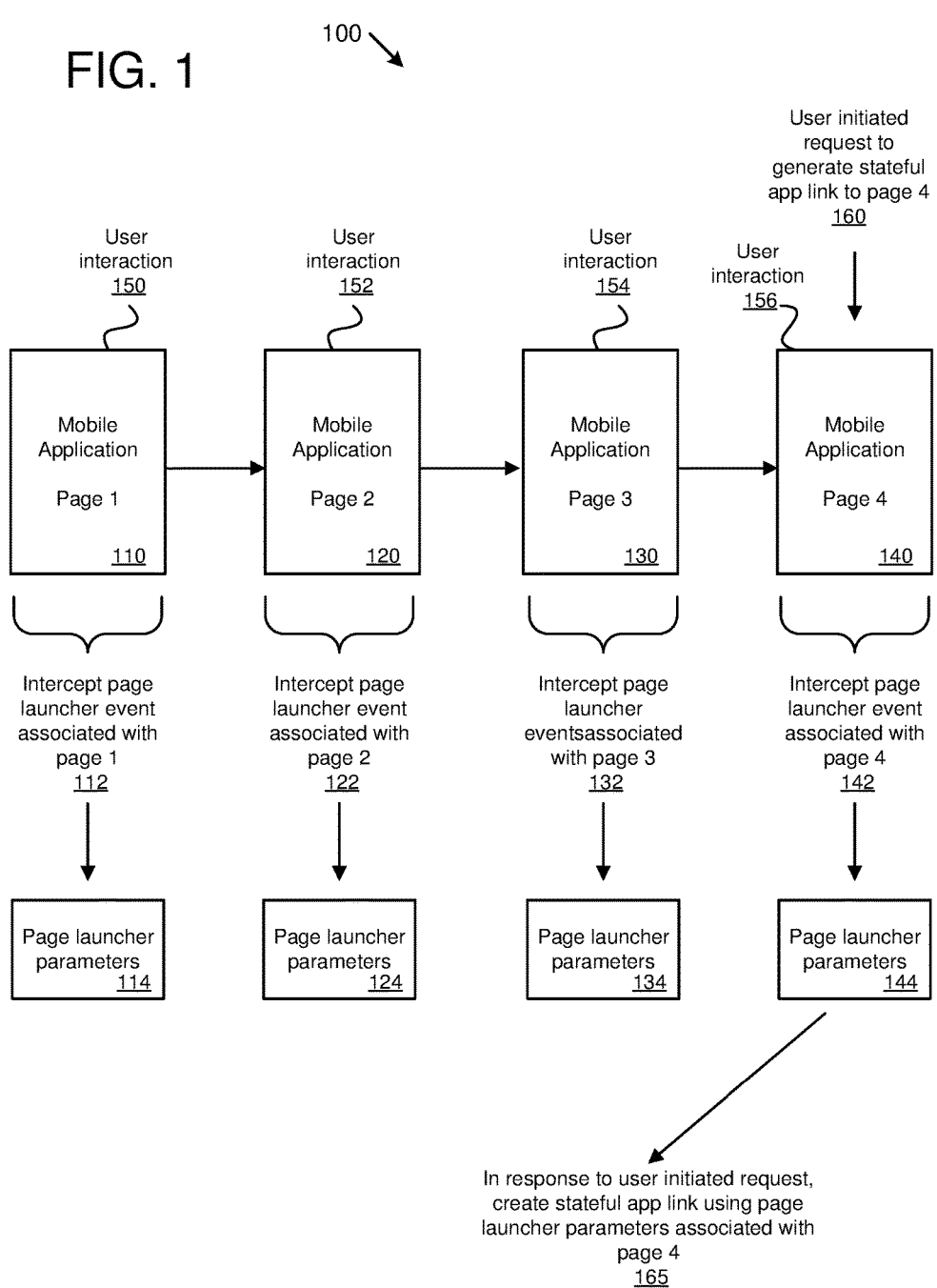
FIG. 1 is a diagram depicting example creation of a stateful app link to a specific page of a mobile application.

As described herein, various technologies can be applied for managing stateful app links. The technologies can be applied to dynamically generating stateful app links. For example, page launcher events can be intercepted during user interaction with a mobile application. During the interaction, a request (e.g., a user initiated request or a request from another source, such as the application, the operating system, the device, etc.) can be received to dynamically generate a stateful app link to a current page of the mobile application. In response to the request, a stateful app link to the current page can be created. The stateful app link can then be output (e.g., saved, emailed, etc.). The stateful app link uses information from the intercepted page launcher events (e.g., captured page launcher parameters). When the stateful app link is activated later, it returns to the current page of the mobile application.

A stateful app link represents a saved application state of a mobile application. For example, the state of a mobile application can include a current page being viewed (e.g., a current page other than an initial page of the mobile application). The state can also include a current view of a current page being viewed (e.g., a default view of a current page or another view of a current page in situations where a page can have multiple views). The state can also include things that happened on previous pages or views (e.g., the sequence of pages that a user interacts with, user input or user selections, etc.). The state can also include things that happen on the current page or view (e.g., user input such as form field input, user selection such as buttons or menus, etc.). The state can also include information from other resources or inputs (e.g., the current location of a computing device obtained from a GPS sensor, the content of a file stored in the file system, etc.).

In some implementations, user interface events are also captured and used when creating the stateful app link. For example, captured user interface events can be saved with the stateful app link and replayed when the stateful app link is activated to return the mobile application to the state it was in when the stateful app link was created. As an example, user interface events can include button presses, entries in form fields, selection of different views of a page (e.g., selection of a user interface element to switch between different views presented by a page), etc.

The technologies can also be applied to activating stateful app links for mobile applications. For example, a stateful app link can be received by a mobile application (e.g., as a result of a user selecting the stateful app link from a saved file, from an email message or instant message, from a saved list of links, from another application the user is interacting with, etc.). The stateful app link can comprise page launcher parameters for returning the mobile application to a specific page of the mobile application. The stateful app link can also comprise user interface events associated with the specific page. The mobile application can be returned to the specific page using the page launcher parameters (e.g., by generating a new page launcher event using the parameters). The user interface events can then be replayed to complete the process of returning the mobile application to the saved application state represented by the stateful app link.

The technologies can also be applied to validate stateful app links. Validation can be performed at various times, including when the link is created or saved, when the link is activated, or when the link is shared. Validation can be performed to determine whether the link has any external dependencies that may prevent the link from working correctly later (e.g., from restoring the complete saved application state). Validation can also be performed for other purposes, such as security, privacy, etc.

The technologies can also be applied to sharing stateful app links. For example, stateful app links can be shared between users and/or between computing devices. Stateful app links can be validated prior to sharing and/or prior to activation (e.g., to enforce security, privacy, or compatibility requirements).

With existing mobile deep linking solutions, it is possible to link to a statically defined page within a mobile application. However, existing mobile deep linking solutions require significant developer effort to implement, cover a small number of pre-defined pages, and are defined statically to navigate to a specific page associated with a specific pre-defined link. In addition, existing mobile deep linking solutions do not provide link validation and associated feedback during saving, activating, or sharing of links.

The technologies described herein provide links for mobile applications that are dynamically created and stateful, called stateful app links. Stateful app links are dynamically created and therefore allow the user to create a stateful app link to any page within a mobile application without the page having to support a static link (as with existing mobile deep linking solutions). In addition, stateful app links are able to save the state of the particular page and view for which the link is being created, including dependencies on previous pages and views, user interface interaction, and sensor input. For example, consider a restaurant location app that allows the user to search for restaurants near the user's location. The user may open the app, obtain the user's current location (e.g., obtained automatically from the GPS or entered by the user), and select a particular restaurant (e.g., from a displayed map). Selecting the particular restaurant can direct the user to a subsequent page of the app which displays details regarding the restaurant (e.g., hours, reservation information, etc.). The user can then save a stateful app link to the current page, which will also save the state of the application, which is dependent on a previous page and previous user interface interaction (in this example, the location of the device and the user's selection of the particular restaurant).

One type of stateful app link is called a shortcut link (also called a shortcut only link). Shortcut links are stateful app links to particular pages of a mobile application. In order to create a shortcut link, page launcher events are monitored and when a request is received to generate a shortcut link to a current page (e.g., to a default view or to a current view, other than the default view, of a current page) the page launcher parameters for the current page are used to create the shortcut link. Shortcut links represent a saved application state of the mobile application. Shortcut links represent the saved application state using state information (e.g., parameters) from the page launcher events. For example, the page launcher event of a restaurant locating app may contain parameters including a specific location and a selected restaurant. The parameters can be used when creating the shortcut link. When the shortcut link is activated later, the restaurant locating app can be launched and returned to the same page and state (e.g., by passing in the same parameters or re-created parameters).

Another type of stateful app link is called a shortcut and replay link. Shortcut and replay links are stateful app links to particular pages of a mobile application that also support replaying user interface events. In order to create a shortcut and replay link, page launcher events and user interface events are monitored, and when a request is received to generate a shortcut and replay link to a current page, or a current view of a current page, the page launcher parameters for the current page, along with the user interface events associated with the current page, as used to create the shortcut and replay link. When the shortcut and replay link is activated, the mobile application returns to the current page and replays the user interface events. Use of a shortcut and replay link allows the mobile application to return to the current page with user interface events performed (e.g., user interface operations, such as selection of menu items, button selections, form field entry, etc.). Use of a shortcut and replay link also allows return to a current view of a current page (e.g., by replaying user interface events to transition from a default view to the current view of the current page).

A mobile application refers to an application (also called an app) that is presented as a series of pages, each of which may contain multiple views. Mobile applications are typically used with mobile devices (e.g., smart phones, tablets, etc.) due to the operating environment of mobile devices in which app transitions are common (e.g., where the user frequently opens, closes, and switches between apps). However, mobile applications are not limited to running on mobile devices, and can run on other types of computing devices as well (e.g., laptop computers, desktop computers, console devices, Internet of things (IoT) devices and appliances, and other types of computing devices). Mobile applications are often obtained from an app store.

The creation of a stateful app link may be initiated by a user (e.g., by receiving a user initiated request to create a stateful app link to a current page or view). A stateful app link may also be created in other ways. For example, a stateful app link may be created by another application (e.g., a search service) that continuously collects and processes content that a user consumes in a mobile application to provide search capabilities (e.g., to search within a history of automatically created stateful app links to the pages and/or views that the user has visited).

Creation of Stateful App Links to Current Pages

In the technologies described herein, stateful app links can be created for pages of a mobile application. A stateful app link represents a saved application state for a current page of a mobile application. When the stateful app link is activated, the mobile application returns to the current page with the saved application state.

FIG. 1 is a diagram 100 depicting example creation of a stateful app link to a specific page of a mobile application (e.g., to a default view of the specific page). In the diagram 100, a user is interacting with the mobile application on a computing device (e.g., a smart phone, a tablet, a laptop, or another type of computing device). During the user interaction, the user first interacts with page 1 110 (e.g., the initial page of the mobile application that is displayed when the mobile application is first launched), then transitions to page 2 120, then to page 3 130, and finally to page 4 140. The user interaction (depicted at 150, 152, 154, and 156) can include selecting buttons, selecting menu options, entering information into form fields, selecting items on a map, and other types of user interaction that can be performed for a mobile application.

Page launcher events associated with each page are intercepted. With reference to the diagram 100, a page launcher event associated with page 1 110 is intercepted, as depicted at 112. From the page launcher event, page launcher parameters are captured, as depicted at 114. The page launcher event that launches page 2 120 is intercepted, as depicted at 122, and the page launcher parameters are captured, as depicted at 124. The page launcher event that launches page 3 130 is intercepted, as depicted at 132, and the page launcher parameters are captured, as depicted at 134. The page launcher event that launches page 4 140 is intercepted, as depicted at 142, and the page launcher parameters are captured, as depicted at 144.

To illustrate the creation of a stateful app link, a request to generate a stateful app link to page 4 140 is received, as depicted at 160. For example, the user can initiate the request to generate a stateful app link by performing an action (e.g., selecting a user interface element such as a button or icon, performing a physical action such as shaking the device, speaking a command that is processed by a personal digital assistant application, or perform some other action). In response to the request, a stateful app link is created to page 4 140, as depicted at 165. The stateful app link is created using the page launcher parameters 144 that were intercepted from the page launcher event associated with page 4 (depicted at 142). Because the request is to create a stateful app link to page 4 140, only the page launcher parameters 144 associated with page 4 140 are used (the page launcher parameters associated with the previous pages, including page launcher parameters 114, 124, and 134, are not used). Page launcher parameters are not needed for the previous pages because any parameters needed for the current page (page 4 140 in this example) would be passed in with the page launcher event for page 4 140. For example, if a location of the device is determined at page 2 120, and the location is needed on subsequent pages (e.g., to display a map of nearby restaurants), then the location would be passed in the page launcher parameters for subsequent pages (e.g., passed into page 3 130 and page 4 140). In some implementations, the request to generate the stateful app link (as depicted at 160) can come from a source other than the user (e.g., from the application, from the operating system, from the device, etc.).

When the stateful app link is activated later, it returns the mobile application to the current page (in this example, page 4 140) with the saved application state. The saved application state includes state information from the page launcher parameters used to create the stateful app link (in this example, page launcher parameters 144). The saved application state can also include other state information such as user interface events that are saved along with the stateful app link. For example, the user may have performed some user interaction on page 4 140 before initiating the request to save the stateful app link (e.g., selected a menu item, entered some information in a form field, etc.). Such user interaction can be recorded by monitoring user interface events which are then saved along with the stateful app link. When the stateful app link is activated, the user interface events can be replayed in order to complete the process of returning to the saved application state.

Creation of Stateful App Links to Current Views of Current Pages

In the technologies described herein, stateful app links can be created for specific views of specific pages of a mobile application. A stateful app link represents a saved application state for a current view of a current page of a mobile application. When the stateful app link is activated, the mobile application returns to the current view and page with the saved application state.

Figure 2:
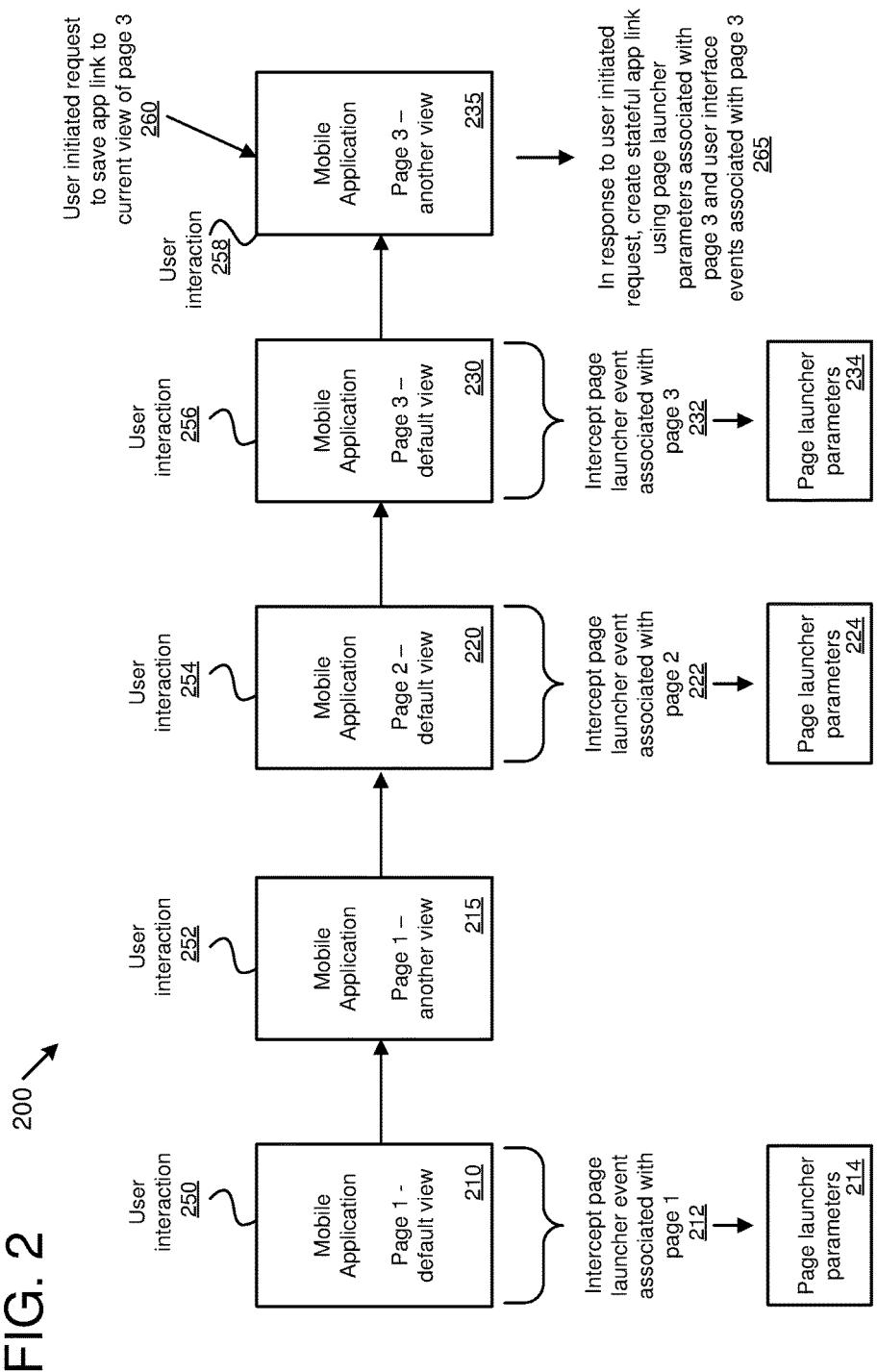
FIG. 2 is a diagram depicting example creation of a stateful app link to a specific view of a page of a mobile application.

FIG. 2 is a diagram 200 depicting example creation of a stateful app link to a specific view of a page of a mobile application. For example, mobile applications may support a number of pages, where each page may contain text, images, graphics, user interface elements (e.g., buttons, checkboxes, lists, menus, etc.), and other types of application content. In some applications, pages only have one view, which can also be called a default view of the page. In other applications, pages can have one or more views. For a page that has multiple views, the initial view that is presented when the page is first displayed is called the default view. From the default view, other views can be presented. For example, a user may navigate to a page, be presented with a default view of the page, and then select a user interface element (e.g., tab, menu item, or button) to switch to a different view of the same page.

In the diagram 200, a user is interacting with the mobile application on a computing device (e.g., a smart phone, a tablet, a laptop, or another type of computing device). During the user interaction, the user first interacts with a default view of page 1 210, selects another view of page 1 215 (e.g., by selecting a user interface element to switch to the other view of the page), transitions to a default view of page 2 220, then transitions to a default view of page 3 230, and selects another view of page 3 235. The user interaction (depicted at 250, 252, 254, 256, and 258) can include selecting buttons, selecting menu options, entering information into form fields, selecting items on a map, and other types of user interaction that can be performed for a mobile application.

Page launcher events associated with each page are intercepted. With reference to the diagram 200, a page launcher event associated with page 1 210 is intercepted, as depicted at 212. From the page launcher event, page launcher parameters are captured, as depicted at 214. The page launcher event that launches page 2 220 is intercepted, as depicted at 222, and the page launcher parameters are captured, as depicted at 224. The page launcher event that launches page 3 230 is intercepted, as depicted at 232, and the page launcher parameters are captured, as depicted at 234.

In addition to the page launcher events, user interface events that are triggered by the user interaction (250, 252, 254, 256, and 258) are recorded. For example, event handlers that are associated with the user interface events can be monitored to perform the recording. For example, a user interface event can be a user selection of a particular button on a particular page or view.

To illustrate the creation of a stateful app link, a user initiated request to generate a stateful app link to a current view of page 3 235 is received, as depicted at 260. For example, the user can initiate the request to generate a stateful app link by performing an action (e.g., selecting a user interface element such as a button or icon, performing a physical action such as shaking the device, speaking a command that is processed by a personal digital assistant application, or perform some other action). In response to the user initiated request, a stateful app link is created to the current view of page 3 235, as depicted at 265. The stateful app link is created using the page launcher parameters 234 were intercepted from the page launcher event associated with page 3 (depicted at 232). Because the request is to create a stateful app link to page 3, only the page launcher parameters 234 associated with page 3 230 are used (the page launcher parameters associated with the previous pages, including page launcher parameters 214 and 224, are not used). Page launcher parameters are not needed for the previous pages because any parameters needed for the current page (page 3 in this example) would be passed in with the page launcher event for page 3. The stateful app link is also created using the user interface events associated with page 3, including any views prior to the current view. In this example, the user interface events that are used to create the stateful app link are the user interface events associated with the default view of page 3 230 and the current view of page 3 235 (represented by the user interaction 256 and 258). In some implementations, the request to generate the stateful app link (as depicted at 260) can come from a source other than the user (e.g., from the application, from the operating system, from the device, etc.).

When the stateful app link is activated later, it returns the mobile application to the current view of the current page (in this example, the current view of page 3 235) with the saved application state. The saved application state includes state information from the page launcher parameters used to create the stateful app link (in this example, page launcher parameters 234). The saved application state can also include the user interface events associated with page 3. Activating the stateful app link first returns the mobile application to the default view of page 3 230 from which the user interface events are replayed to return the mobile application to the current view of page 3 235. Replaying the user interface events can include performing user interaction with regard to the default view of page 3 230 and/or with regard to the current view of page 3 235.

Architecture Supporting Creation and Activation of Stateful App Links

In the technologies described herein, stateful app links can be created for specific views of specific pages of a mobile application. A stateful app link represents a saved application state for a current view of a current page of a mobile application. When the stateful app link is activated, the mobile application returns to the current view and page with the same application state that existed when the stateful app link was saved (called a saved application state).

Figure 3:
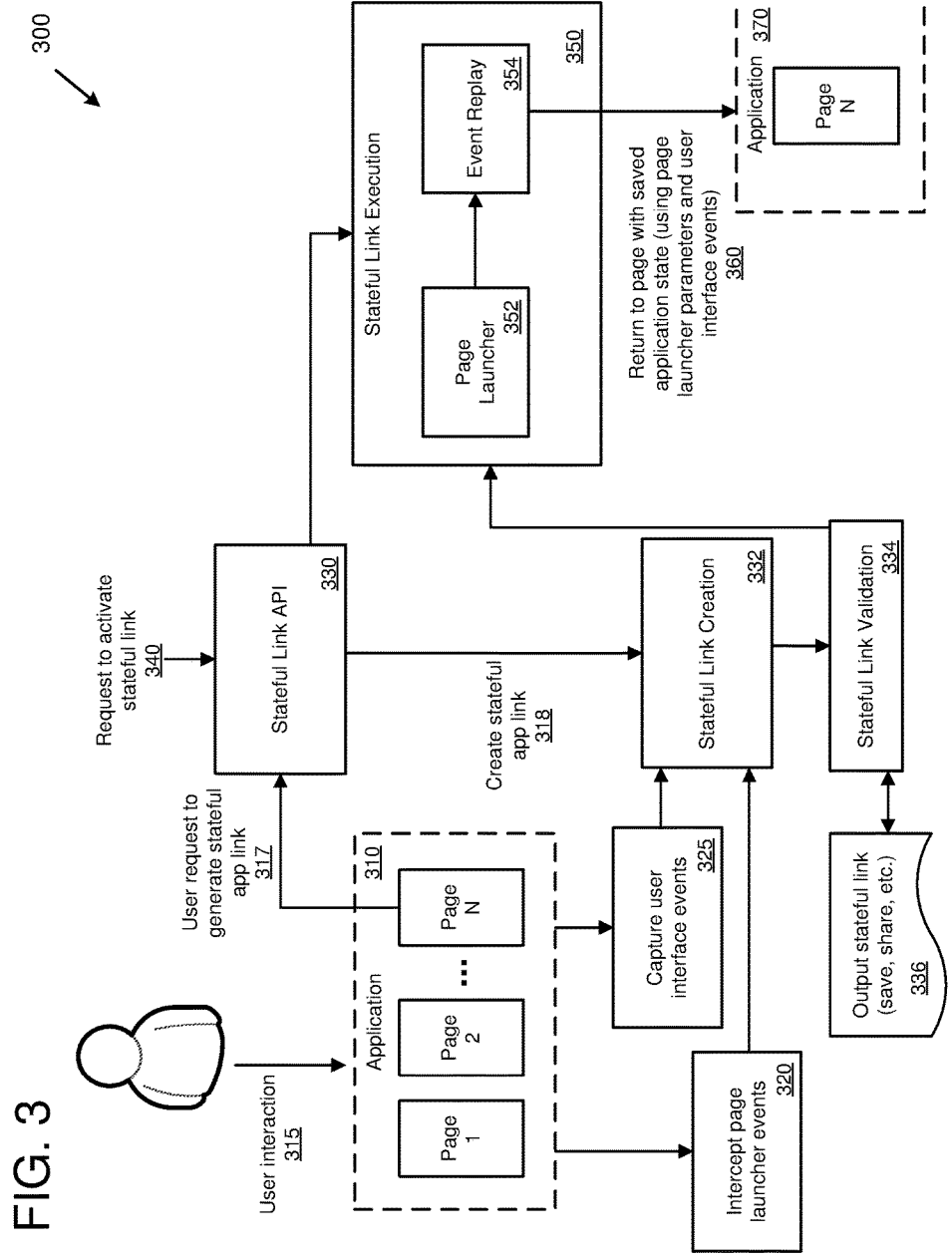
FIG. 3 is a diagram depicting an example architecture for creating stateful app links for mobile applications.

FIG. 3 is a diagram depicting an example architecture 300 for creating stateful app links for mobile applications. In example architecture 300, support for stateful app links is provided by a code library that the application developer incorporates into the application. The code library provides the various components that support creation and activation of stateful app links, and in some implementations stateful link validation.

In order to support dynamic generation of stateful app links, page launcher events are intercepted (as depicted at 320), and user interface events are captured (as depicted at 325), during user interaction (as depicted at 315) with the mobile application 310. When a user request is received to generate a stateful app link (as depicted at 317), a stateful link API component 330 initiates the process of creating the stateful app link, as depicted at 318. Creation of the stateful app link is performed by the stateful link creation component 332, which obtains page launcher parameters for the current page as well as user interface events associated with the current page. Stateful link creation can be performed for a current page (e.g., for a default view of a current page) or for a current view of a current page (e.g., a current view other than the default view). After the stateful app link has been created, it is output, as depicted at 336. For example, the stateful app link can be saved to a file, shared with another user, posted to a web site, etc.

In some implementations, a stateful link validation component 334 validates stateful app links. Validation can be performed after the link has been created, when the link is being activated, or at another time. For example, once the stateful app link has been created it can be validated before it is output. As another example, a stateful app link can be validated before it is activated (e.g., upon receiving a request to activate the stateful app link).

In order to support activation of stateful app links that have been previously created, the example architecture 300 includes a stateful link execution component 350. For example, when a request to activate a stateful app link is received (e.g., by the stateful link API component 330 as depicted at 340), the stateful app link is received by the stateful link execution component 350 (e.g., retrieved from a previously output stateful app link, as depicted at 336, which may pass through the stateful link validation component 334). The stateful app link is executed using a page launcher component 352 which returns the mobile application to the current page indicated by the stateful app link and an event replay component 354 which replays user interface events indicated by the stateful app link. As depicted at 360 and 370, the activation of the stateful app link returns the mobile application to the current page with the saved application state.

In example architecture 300, support for stateful app links is provided by a code library that the application developer incorporates into the application. In other implementations, stateful app links can be supported by the application framework. In such implementations, the application framework supports the creation and activation of stateful app links separately from mobile applications, and therefore does not require any mobile application support (i.e., mobile applications do not need to be modified to support stateful app links). In yet other implementations, stateful app links are supported at the operating system level (below the application framework level), which also does not require any mobile application support.

Methods for Dynamically Generating and Activating Stateful App Links for Mobile Applications In any of the examples herein, methods can be provided for dynamically generating and activating stateful app links for mobile applications. For example, a user can save a stateful app link to any given page or view of a mobile application without the application developer having to statically support deep links on a given page or view.

Figure 4:
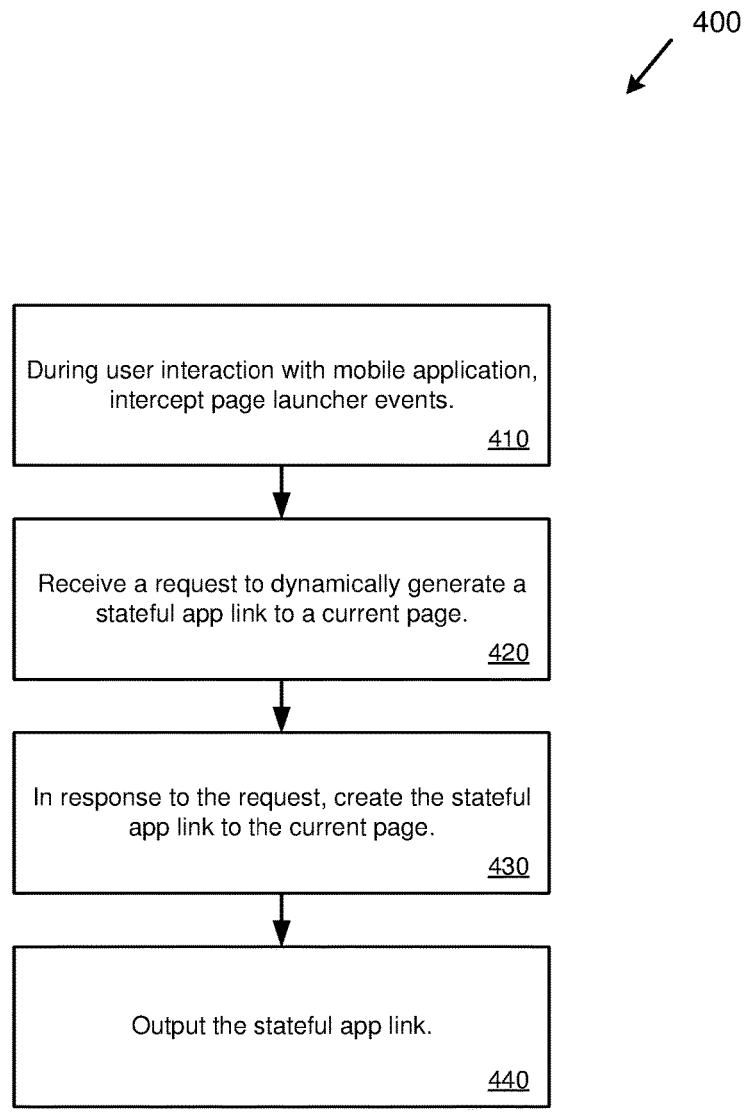
FIG. 4 is a flowchart of an example method for creating a stateful app link to a page of a mobile application.

FIG. 4 is a flowchart of an example method 400 for dynamically generating stateful app links for mobile applications. At 410, page launcher events are intercepted during user interaction with a mobile application. Intercepting the page launcher events can comprise capturing page launcher parameters used by the page launcher events.

At 420, a request to dynamically generate a stateful app link to a current page is received (e.g., a user initiated request or a request from another source, such as the application, the operating system, the device, etc.). In some implementations, the stateful app link is generated for a current view of the current page. The stateful app link represents a saved application state of the mobile application (e.g., as reflected by the page launcher parameters and/or user interface events associated with the current page and/or views of the current page). For example, the saved application state of the mobile application can be dependent upon one or more previous pages and/or views during the user interaction. For example, user interaction (e.g., button presses, menu selections, etc.) and other activity (e.g., sensor input) from previous pages can affect the state of the mobile application can be represented by the page launcher event for the current page.

At 430, the stateful app link to the current page is created in response to the request. The stateful app link is created based at least in part on the intercepted page launcher event (e.g., using the page launcher parameters). In some implementations, the stateful app link is also created based on user interface events recorded during the user interaction with the mobile application. In some implementations, only the page launcher parameters associated with the page launcher event of the current page (and not previous pages) are used when creating the stateful app link. In some implementations, only the user interface events recorded for the current page, which may be associated with multiple views of the current page, are used when creating the stateful app link along with the page launcher parameters for the current page.

At 440, the stateful app link is output. For example, the stateful app link can be saved or shared. When the stateful link is activated, it causes the mobile application to return to the current page with the saved application state (e.g., using the page launcher parameters and/or user interface events). In some implementations, activation of the stateful app link causes the mobile application to return to a default view of the current page (where the stateful app link was saved from the default view of the current page) or to a current view of the current page (where the stateful app link was saved from the current view, other than the default view, of the current page). In implementations where user interface events are recorded, activation of the stateful app link involves returning the mobile application to the current page and replaying the user interface events (e.g., to perform user interface actions on the current page and/or on one or more views of the current page).

Figure 5:
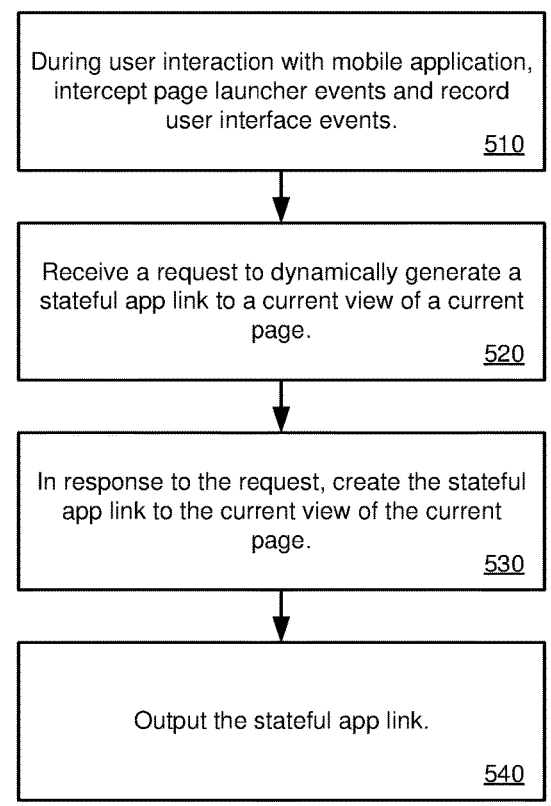
FIG. 5 is a flowchart of an example method for creating a stateful app link to a current view of a current page of a mobile application.

FIG. 5 is a flowchart of an example method 500 for dynamically generating stateful app links to current views of current pages of mobile applications. At 510, page launcher events are intercepted during user interaction with a mobile application. Intercepting the page launcher events can comprise capturing page launcher parameters used by the page launcher events. In addition to page launcher events, user interface events are recorded during the user interaction with the pages and/or views of the mobile application.

At 520, a request to dynamically generate a stateful app link to a current view of a current page is received (e.g., a user initiated request or a request from another source, such as the application, the operating system, the device, etc.). The stateful app link represents a saved application state of the mobile application (e.g., as reflected by the page launcher parameters and user interface events associated with the current view of the current page). For example, the saved application state of the mobile application can be dependent upon one or more previous pages and/or views during the user interaction. For example, user interaction (e.g., button presses, menu selections, etc.) and other activity (e.g., sensor input) from previous pages and views can affect the state of the mobile application and can be represented by the page launcher event for the current page.

At 530, the stateful app link to the current view of the current page is created in response to the request. The stateful app link is created based at least in part on the intercepted page launcher event (e.g., using the page launcher parameters) and the recorded user interface events. In some implementations, only the page launcher parameters associated with the page launcher event of the current page (and not previous pages) and the user interface events associated with the current page are used when creating the stateful app link.

At 540, the stateful app link is output. For example, the stateful app link can be saved or shared. When the stateful link is activated, it causes the mobile application to return to the current view of the current page with the saved application state. Activation of the stateful app link causes the mobile application to return to the current page from which the user interface events are replayed (e.g., to perform user interface actions on the current page and/or on one or more views of the current page).

Figure 6:
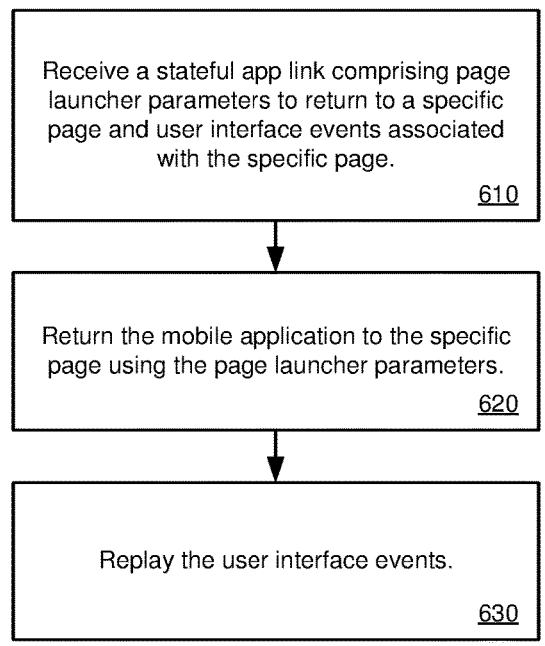
FIG. 6 is a flowchart of an example method for activating a stateful app link for a mobile application.

FIG. 6 is a flowchart of an example method 600 for activating stateful app links for mobile applications. At 610, a stateful app link is received. For example, the stateful app link can be received by a mobile application, by an application framework, or by an operating system. The stateful app link can be received from a local source (e.g., from a file, from a received email or instant message, from the operating system, from an application, etc.). The stateful app link can also be received from a remote source (e.g., retrieved from a stateful app link resolution service). The stateful app link represents a saved application state of the mobile application when the stateful app link was generated. The stateful app link comprises page launcher parameters for returning the mobile application to a specific page of the mobile application. The stateful app link also comprises user interface events associated with the specific page (e.g., associated with one or more views of the specific page).

At 620, the mobile application is returned to the specific page using the page launcher parameters. For example, a page launcher event can be initiated with the page launcher parameters from the stateful app link.

At 630, the user interface events are replayed. For example, the user interface events can be replayed on the specific page to perform user interface actions on the specific page. The user interface events can also be replayed for a number of views of the specific page.

Example Implementations for Creating and Activating Stateful App Links

This section describes example implementations for creating and activating stateful app links. The technologies described in this section can be used separately or in combination with other technologies described herein.

Mobile applications consist of a set of pages, where each page typically contains a set of user interface (UI) elements such as buttons, checkboxes, lists, or menus. Each UI element can have an associated event handler, which is invoked when the element is interacted with. The whole of a page may not be viewable to the user at once; the part of the page shown in the current screen (e.g., the integrated display of the mobile device) is called a view. A page may contain many views: the default view is what is shown on the screen when the user navigates to the page, and the user can navigate to a different view within the same page by UI interactions such as selecting a tab, choosing a date from a date picker control, filling out a search box, clicking on a search button, scrolling, swiping, etc. A UI interaction can also lead from a view to the default view of a separate page.

Mobile apps are stateful and pages/views can have state dependencies. A page can use some data generated in a previous page. For example, a particular page of an app may need the location selected by the user on a previous page. A view can also depend on another view (e.g., one tab uses a flag set in another tab). A view of a particular page can also depend on the sequence of UI actions starting from the default view of the particular page.

Using this terminology, three broad classes of links can be identified (listed in increasing order of complexity to support them).
1. Stateless view: A view whose state does not depend on states created in previous pages. A stateless view can be created without any input parameter, or using a set of statically-defined parameters that do not depend on previous pages/views.
2. Stateful view: A view whose state depends on app states created in previous pages.
3. UI-driven view: A view created by UI events generated on the same page.

Existing mobile deep linking solutions only support the first class of links (stateless views). They can pass static parameters to target views, but cannot observe the internal state of the app (they live outside the app). This is precisely the reason why they cannot cover stateful or UI-driven views that depend on states (e.g., location selected by the user) and UI events (e.g., tapping on a particular tab) inside the app.

In contrast, the stateful app link technologies described herein also support links to stateful views and UI-driven views.

In some implementations, stateful app links are provided for stateful views. Stateful views depend only on data from previous pages. A link to a stateful view points to the default view of its page.

A page in an app is usually instantiated through a launcher method responsible for rendering the page in the foreground (startActivity(intent,options) in Android™ and prepareForSegue:(uiStoryboardSegue) in iOS®). This method usually expects as input a description of the page to render and possibly other parameters, which are not known to processes external to the app.

In order to create stateful app links, page launcher events that invoke these page launcher methods can be monitored and intercepted. For example, the page launcher events can be monitored to intercept input parameters and message structures. The input parameters and message structures can be encoded in a stateful app link, which in some implementations is similar in structure to a uniform resource identifier (URI). To activate (open) a saved stateful app link, the page launcher method is invoked with properly structured messages assembled using the page launcher parameters stored in the stateful app link. In this way, stateful app links can provide a shortcut to the default view of any page in the app.

Assuming the stateful app link is opened under the same conditions (e.g., file system state, sensor readings, network, and so forth) as when it was created, this approach can guarantee accurate and safe stateful links. They are accurate because when a user requests capturing a link to the current view, the link is derived directly based on what app state was provided to that view. They are safe because this process does not risk breaking the program logic.

In some implementations, stateful app links are implemented by overloading the page launcher method of the framework page classes (e.g., startActivity method of Android Activity classes).

In some implementations, stateful app links are provided for UI-driven views. While stateful app links for stateful views are able to return the app to a particular page (e.g., the default view of the particular page), they do not capture UI events and thus are not able to capture the state of a UI-driven view. Stateful app links that support UI-driven views extend support to captured UI events.

To support UI-driven views, stateful app links are extended to utilize a shortcut and replay approach in which UI events triggered during user interaction are monitored and recorded. In some implementations, in order to reduce overhead, a record of UI events is only maintained for the current page (e.g., when a new page is accessed, the UI events from the previous page are discarded). This does not compromise coverage because the default view of the current page can be accessed using a shortcut-only link.

To create a stateful app link to a UI-driven view, two pieces of information are encoded in the link: (1) input parameters to the page launcher method of the current page (this is the same as for shortcut-only links), and (2) UI events that lead the user from the current page's default view to the current view. When the link is invoked, the page's default view is first launched by using its input parameters, and then the UI events are replayed to navigate to the target view. For example, the UI events can be replayed in the background so that the user is returned directly to the target view, with a similar experience as the shortcut-only links.

Mobile app content can be dynamic. For example, suppose a page's default view shows a list of restaurants. The user clicks on the $2^{nd}$ item "Kabab Palace" to generate a view with the details and menu of the restaurant, and saves a link to the view. Now suppose, after a month, the app updates its contents and the same restaurant "Kabab Palace" appears as the $5^{th}$ item in the list. To deal with such changes content is prioritized over UI structure during replay. In this example, the list will be searched to find "Kabab Palace," and if it exists it will be selected regardless of its position in the list. However, if "Kabab Palace" does not appear in the list anymore, the system will fall back to structural replay and click on the $2^{nd}$ item of the list. Such fallback is useful to deal with highly dynamic content, such as a link to the top news story, which may change frequently.

The shortcut and replay techniques described herein provide advantages over traditional record and replay tools. For example, shortcut and replay stateful app links do not require any recording start point, and they are much faster. Imagine a task where the user searches through old news by first entering some keywords and then specifying a date range, thus landing on the page with the news matching the specified criteria. Assume the user wants to save a link to this page with the results. A traditional record and replay tool (i)

would require the user to specify the start point of the task (i.e., the page where the keywords were entered) and (ii) would replay every single user action to re-create the search results, i.e., entering the search string, clicking on the start date button, pressing the search button, etc. Instead, with shortcut and replay links, the parameters needed to generate the search result page are intercepted and, through a single function call, the page is loaded, and only those UI interactions recorded for the search result page need to be replayed.

FIG. 7 is a diagram depicting examples of stateful app links, including a shortcut only link and a shortcut and replay link. In the diagram, an example of a shortcut only link 710 is depicted. The shortcut only link 710 includes an activity name 711 (defining the page the shortcut only link references) and is identified by a unique identifier 712. The shortcut only link 710 is associated with a particular mobile application via a mobile app name 714 identifier. The main portion of the shortcut only link 710 is the intent plus input parameters 716 content, which defines the content (the page launcher parameters) of the page launcher event (in this example, the shortcut only link is for launching an app on the Android operating system). The shortcut only link 710 also includes a timestamp 718 identifying the creation time of the link.

An example of a shortcut and replay link 720 is also depicted in the diagram. The shortcut and replay link 720 includes an activity name 721 (defining the page the shortcut and replay link references) and identified by a unique identifier 722. The shortcut and replay link 720 is associated with a particular mobile application via a mobile app name 724 identifier. The shortcut and replay link 720 contains a section defining the page launcher event, and corresponding page launcher parameters, which is identified by the intent plus input parameters 726 content. The shortcut and replay link 720 also includes a timestamp 728 identifying the creation time of the link. Finally, the shortcut and replay link 720 defines the UI events that are to be replayed 730 (in this example, a particular user interface button that is to be selected).

Validating Stateful App Links for Mobile Applications

In any of the examples herein, stateful app links can be validated. For example, validation can be performed when stateful app links are created, when they are shared, when they are activated, or at other times.

In some situations, a stateful app link, when accessed later, may not be able to re-create the entire state of the mobile application as it existed when the stateful app link was created. For example, consider a music application where the current page is a page for playing a particular music file and where the user saves a stateful app link to the current page. If the particular music file is deleted after the stateful app link is saved, then the stateful app link will not be able to return to the same application state (e.g., an error may be displayed reporting that the particular music file cannot be found). This is an example of a file system dependency. As another example, consider a mapping application where the current page displays a map based on the current GPS location of the device and where the user saves a stateful app link to the current page. When the stateful app link is accessed later and the device is in a different GPS location, the map contents on the page will be different. This is an example of a sensor dependency.

One type of validation that can be performed for stateful app links is checking whether stateful app links are dependent upon external resources. An external resource is a resource that is external to the mobile application. Examples of external resources include file system resources (e.g., files stored on a storage device of the device or remotely accessed files), database resources, and sensor resources (e.g., GPS, accelerometer, camera, etc.). In order to perform validation, a log of the events triggered by the mobile application can be maintained and when a request is received to generate a stateful app link the log can be checked to see if there are any dependencies on external resources that could affect the saved application state for the current page and/or view being saved.

Figure 8:
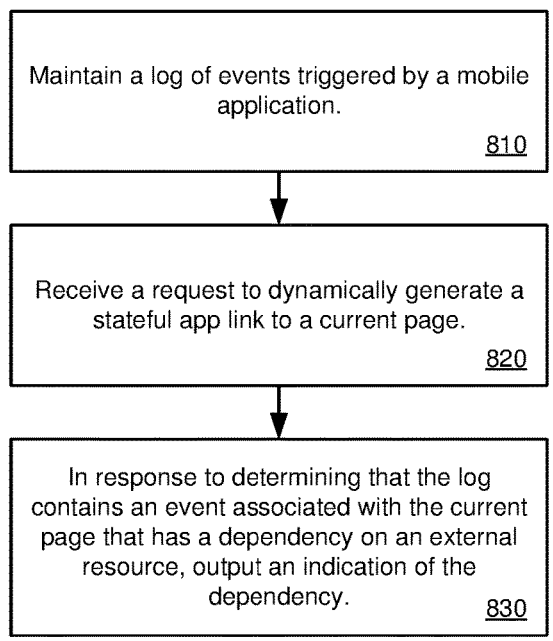
FIG. 8 is a flowchart of an example method for validating stateful app links for mobile applications.

FIG. 8 is a flowchart of an example method for validating stateful app links for mobile applications. At 810, a log of events triggered by the mobile application is maintained. The events are associated with selected event handlers of the mobile application. In some implementations, the selected events handlers are only those event handlers of the mobile application that are associated with resources external to the mobile application (e.g., file system resources, database resources, sensor resources, etc.). A log can also be maintained for data communicated between different runtime states of the mobile application (e.g., to capture page launcher parameters to be used when creating the stateful app link).

At 820, a request is received to dynamically generate a stateful app link to a current page of the mobile application (e.g., a user initiated request or a request from another source, such as the application, the operating system, the device, etc.). Where the mobile application supports multiple views of a given page, the stateful app link can be received for a default view of the current page or for a current view (other than the default view) of the current page.

At 830, in response to determining that the log contains an event associated with the current page that has a dependency on an external resource (a resource external to the mobile application), an indication of the dependency is output. For example, an alert can be presented to the user, or the alert can be output in another way (e.g., output to the application or to the operating system) indicating that the saved application state of the mobile application may not be fully recovered when the link is activated later. The event could be associated with the current page, with a default view of the current page, or with another view of the current page. Depending on the specific dependency, the stateful app link may still be created (e.g., with a warning message) or it may not be created (e.g., with an error message)

Another type of validation that can be performed for stateful app links is checking for security, privacy, and/or other issues. Checking for security and privacy issues can be important when a stateful app link is being shared (e.g., sent to a friend or posted on a web site). For example, checking for security of the link can include checking whether the link, when activated, will change any settings of the mobile application (e.g., application preference settings) or will activate a monetary transaction (e.g., purchasing an item for the second time); checking for privacy of the link can include checking whether the link includes any privacy-sensitive information (e.g., username/password information, private phone number, bank account number, etc.).

Performing validation to check for security, privacy, compatibility, and other issues can be performed at various times. For example, the validation can be performed when the link is created (e.g., at a time of outputting the stateful app link). If the link fails the validation, an error can be presented (e.g., stating why the link cannot be created) or be passed to the calling entity (e.g., another application installed on the device). Alternatively, the link may still be created but identified as having an issue (e.g., a security issue that would only affect the link if it is shared outside the current device). The validation can also be performed when the link is being shared (e.g., at some time after it has been created). For example, an attempt to share a stateful app link can initiate validation for security, privacy, compatibility, and/or other issues. Failure of the validation may prevent the link from being shared. The validation can also be performed when the link is being activated (e.g., on the same device by the same user, or upon being received and/or activated at a destination device as the result of the link being shared).

Figure 9:
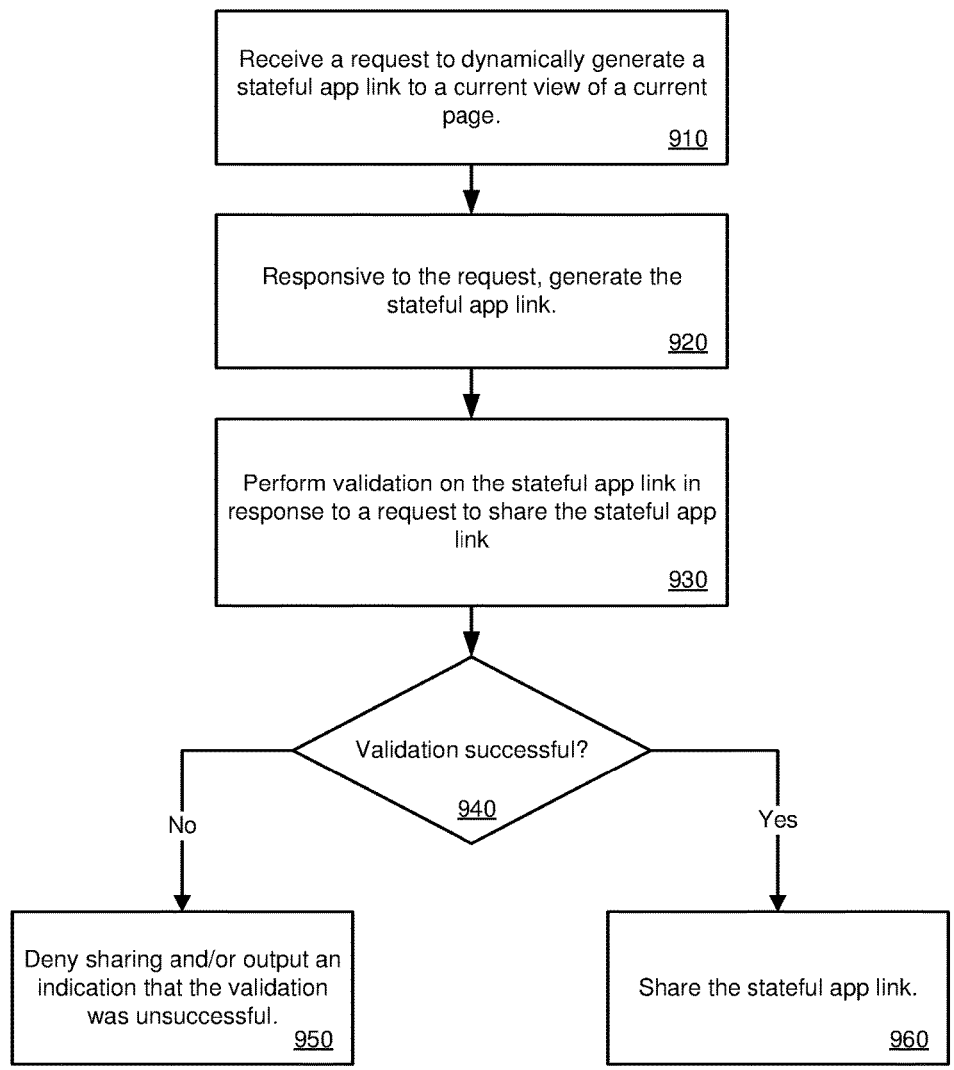
FIG. 9 is a flowchart of an example method for validating stateful app links for mobile applications.

FIG. 9 is a flowchart of an example method for validating stateful app links for mobile applications. At 910, a request is received to dynamically generate a stateful app link to a current view of a current page of the mobile application. At 920, the stateful app link is generated in response to the request.

At 930, validation is performed on the stateful app link in response to a request to share the stateful app link. For example, a user can create a stateful app link to a particular view of a particular page of a mobile application. When the link is created, or at a later time, the user can share the stateful app link (e.g., send it to a friend, post it on a web site, etc.).

At 940, the result of the validation is checked. If the validation is not successful, then the method proceeds to 950 where appropriate action is taken. For example, the sharing request can be denied and/or an indication that the validation was unsuccessful can be output (e.g., a message to the user indicating why the link cannot be shared). In some situations, the sharing may still be allowed if the validation was unsuccessful (e.g., along with a warning message). If the validation is successful, the method proceeds to 960, where the stateful app link is shared.

Example Implementations for Validating Stateful App Links

This section describes example implementations for validating stateful app links. The technologies described in this section can be used separately or in combination with other technologies described herein.

Validation of stateful app links (links) can be used to provide feedback to the user at the time of link creation, activation, or sharing. To provide an example, suppose a user navigates from Page1 of a mobile application to Page2 of the mobile application and wishes to create a link to Page2. Can the link be invoked later to correctly return to the same content? The answer depends on whether the pages access any external resource such as a file (outside the parameters explicitly transferred from Page1 to Page2's page launcher method). The following four cases illustrate when dependency on external resources can cause a problem.

Case (a)

No external dependencies: activating the link can correctly open Page2 by providing the parameters in the link to the launcher method of Page2.

Case (b)

Page2 reads an external resource: In this case a stateful app link (1) may not be able to correctly open Page2, or (2) may be able to open the page, but with potentially different content. This may happen if the content of the external resource is modified after the link is created. For example, if Page2 plays a specific music file from the local device, a link to the page will fail if the music file is deleted from the device. Similarly, if Page2 shows content of a local file, a link to the page will show different content if the file is modified after the link is created.

Case (c)

Page2 writes an external resource: a stateful app link can correctly open Page2, since the content of the external resource does not affect the content of Page2. So Page2 remains unaffected even if the external resource is modified after the link is created.

Case (d)

Page1 reads an external resource: a stateful app link may or may not correctly open Page2. If the external resource somehow affects the content of Page2, and if the content of the resource has not been modified after the link is created, the modified value will propagate through the parameters passed from Page1 to Page2, which will be captured. However, if the content of the resource has been modified after the link is created, the modified value will not propagate from Page1 to Page2

Of all the above cases above, in Case (b) and Case (d) a stateful app link may not be able to correctly open a link to Page2. If such situations are identified, the users or the companion services can be notified during link creation time that the link may not be replayed correctly if a specific resource is modified. This check can be implemented as part of the link validation process.

In order to perform validation to check for dependency on external resources, an offline analysis of the mobile application is performed to generate an app-specific summary of resource dependencies for each event handler. Once the summary is built offline, it can be installed on the device (e.g., as part of the library supporting stateful app links) and utilized when a link is saved, activated, shared, etc.

Building the summary involves two procedures, static analysis and dynamic analysis. In describing static and dynamic analysis, a resource refers entities external to the app (e.g., file system resources, database resources, sensor resources, external resources accessed via a network, etc.), source APIs and sink APIs refer to the APIs that the application framework provides to get or put data, respectively, into such resources, and callbacks refer to event handlers triggered, synchronously or asynchronously, by the app or by the framework.

During static analysis, a call graph of the app is generated and then recursively traversed to find out a connected path from a callback to a source or sink API. If a connecting path is found, the mapping <callback,source> or <callback,sink> is added to the summary Online, each time a link is saved, the library logs which callbacks have been invoked to generate the app state. In this way, the summary can be used to look up whether any of the required callbacks have dependencies on external resources, and report that in the feedback. Note that once the library is added to the app or the changes are implemented at the framework or operating system level, the developer effort required for the feedback generation is zero, because all link-required callbacks are logged directly by the library.

While static analysis is useful, it can suffer from coarse granularity. For example, knowing that a specific callback reads some file is not sufficient to infer whether this operation may or may not compromise the correctness of the link.

If that file doesn't change after link creation, then the link will work correctly. In order to address this potential issue, dynamic analysis is added.

To address the above potential problem, static analysis is augmented with dynamic analysis. To exemplify, consider the file system resource. While the file identifiers are not known online, they can be captured offline and leveraged to establish callback relationships. This can be accomplished by running each app using a UI automation tool. Logs can then be collected of all invoked callbacks as well as traces of file system access. Read and write operations with the same identifiers can be determined. The obtained file relationships can then be added to the summary.

The summaries can be further augmented by utilizing techniques such as taint-tracking. For each parameter a stateful dynamic link may depend on, taint-tracking can be performed to identify the source of the parameter (e.g., a user input, a sensor input, a file, etc.). This kind of dependency can be added to the summary to handle cases such as Case (d) above.

Once the summaries are generated offline for the mobile applications, they can be used online in the following way. As the user interacts with the apps, the library continuously monitors all callbacks invoked and keeps a log only of those that lead to a file system or database write. When a link previously saved is opened, the link-required callbacks (recorded when the link was saved) are processed using the summary. Any link required callbacks associated with file system writes can be safely ignored (as in Case (c) above). Instead, any link required callbacks associated with file system reads can be ignored only if they have no file-relationship with other write callbacks that were logged after the link was saved. In fact, this means that re-creating the link state requires reading a file that was modified in the past, after the link was saved (as in Case (b) and Case (d) above). If such file dependency is found, a feedback report is generated including details about the identified root cause (e.g., the callback information and the source/sink API). The feedback can be useful to a user or to another application (e.g., a search service). Based on the feedback, one can decide whether the link is valid or invalid, and take actions accordingly Note that, it would not be practical to keep an indefinite log of all write callbacks, for all apps. In some implementations, a runtime log for a maximum period of time (e.g., an hour) is maintained. Writes that are older than the maximum period are likely to have been absorbed by the system (e.g., changes in preferences) so that they can be safely forgotten.

Example Resolution of Stateful App Links

In the technologies described herein, stateful app links can be resolved. For example, a service can be provided (e.g., by a cloud computing platform) that manages stateful app links. The service can support resolution of stateful app links (e.g., identified by unique stateful app link identifiers), validation of stateful app links, and sharing of stateful app links.

Figure 10:
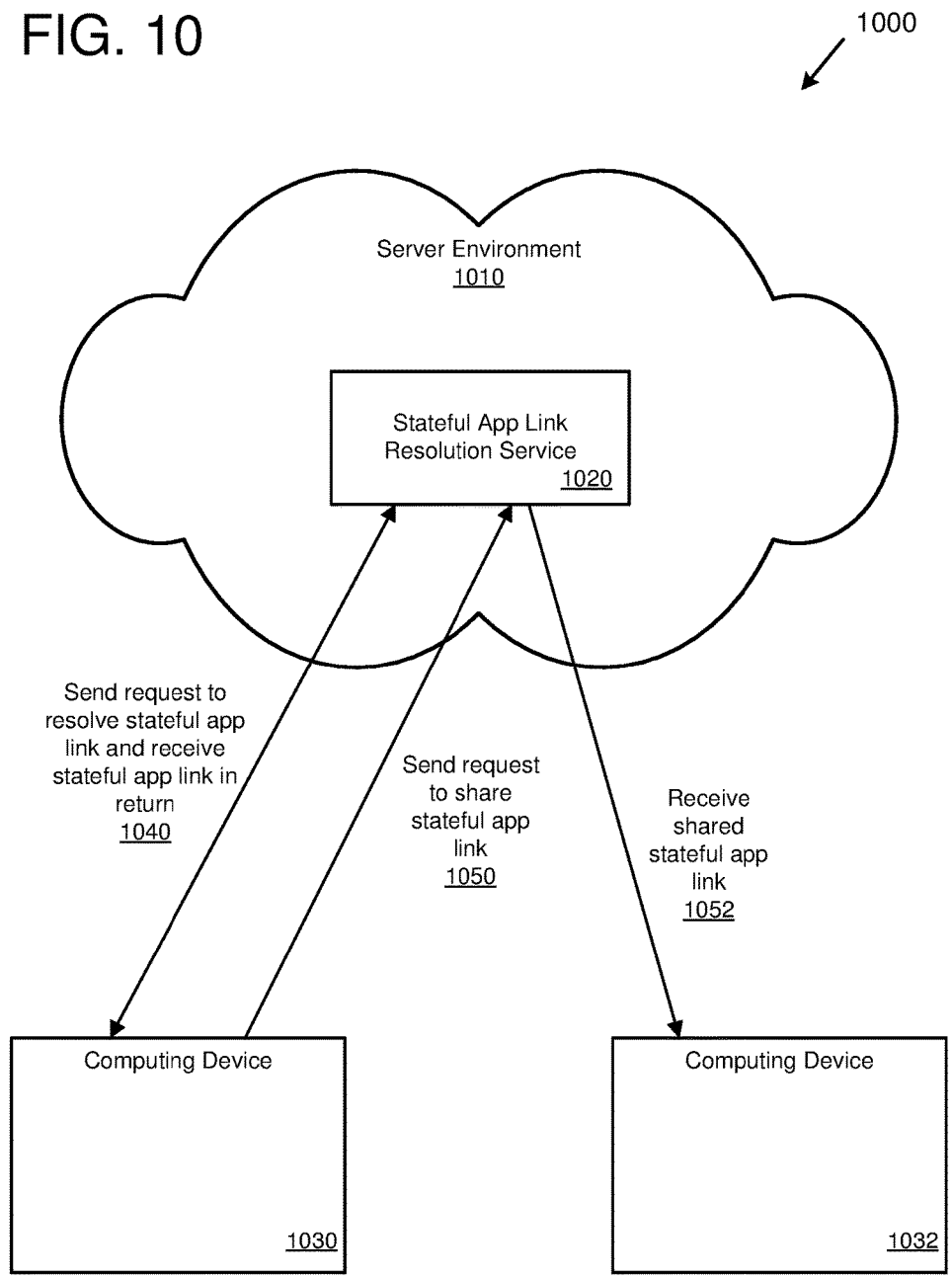
FIG. 10 is a diagram depicting an example environment for resolving stateful app links.

FIG. 10 is a diagram depicting an example environment 1000 for resolving stateful app links. The environment includes a server environment 1010 (e.g., a cloud computing platform or another type of server environment). The server environment 1010 provides a stateful app link resolution service 1020. The stateful app link resolution service 1020 provides remote services for managing stateful app links in an environment that is separate from the client computing devices (e.g., computing devices 1030 and 1032) that utilize the service. In some implementations, the stateful app link resolution service 1020 stores the complete stateful app links (e.g., the full content of the stateful app links, including the page launcher parameters, associated meta-data, etc.). For example, the stateful app link resolution service 1020 can store the stateful app links in a format such as that depicted in FIG. 7. The stateful app link resolution service 1020 can also store meta-data associated with a stateful app link, which can include timing information (e.g., the creation time of the stateful app link), mobile applications used before the stateful app link was created, key words associated with the stateful app link, and semantics associated with the stateful app link. The stateful app link resolution service 1020 can also store stateful app link usage information, such as user history (e.g., which stateful app links a user created, accessed, shared, etc.). In some implementations, the full content of the stateful app links is only stored at the stateful app link resolution service 1020 (and not at the client computing devices, such as computing devices 1030 and 1032, that utilize the resolution service).

The stateful app link resolution service 1020 supports resolution of stateful app links by receiving a request to resolve a stateful app link and returning the full content of the stateful app link. For example, the request to resolve a stateful app link can include a unique identifier of the stateful app link (e.g., a globally unique identifier (GUID), which could be encrypted). The stateful app link resolution service 1020 can then look up the unique identifier to obtain the full content of the stateful app link, which can then be returned. This scenario is depicted at 1040 where the computing device 1030 sends a request to resolve a stateful app link (e.g., comprising a GUID) to the stateful app link resolution service 1020, which looks up the stateful app link (e.g., using the GUID), and returns the stateful app link to the computing device 1030 for use in activating the stateful app link at the computing device 1030.

The stateful app link resolution service 1020 supports resolution of stateful app links during sharing. For example, the computing device 1030 can send a request to share a stateful app link, including a unique identifier (e.g., a GUID), to the stateful app link resolution service 1020, as depicted at 1050. The stateful app link resolution service 1020 can look up the unique identifier to obtain the full content of the stateful app link and send it to computing device 1032, as depicted at 1052. The stateful app link resolution service 1020 (or another component of the server environment 1010) can also perform validation during the sharing process, which can include privacy validation, security validation, and/or other types of validation). In this way, stateful app links can be stored securely at the server environment 1010 and shared between different users and/or different computing devices.

Cross-platform compatibility can be supported by the server environment 1010. For example, stateful app links can be resolved and shared between computing devices running different operating systems.

Web link conversion can be supported by the server environment 1010. For example, a request can be received at the stateful app link resolution service 1020 to convert a stateful app link (identified by a unique identifier) into a web link. The stateful app link resolution service 1020 can look up the full content of the stateful app link and convert it into a web link for a mobile web site that corresponds to the stateful app link, which can then be returned to the requesting computing device. Conversion from a web link to a stateful app link is also possible.

App-app conversion can also be supported by the server environment 1010. For example, a user may save a link in an application installed in the computing device and share it with a user who does not have such an application installed. The link can be converted to work with another application the receiver user may have.

The stateful app link resolution service 1020 can use information other than a unique identifier to identify a stateful app link. For example, the stateful app link resolution service 1020 can use the meta-data to find particular stateful app links. As an example, a user of computing device 1030 may request a stateful app link by providing key words (e.g., tell a digital personal assistant application that the user wants to access a particular stateful app link by saying, "open the link to the restaurant I saved two days ago"). The stateful app link resolution service 1020 can use the key words to identify the stateful app link using meta-data (e.g., via key word or semantic information from the meta-data).

The stateful app link resolution service 1020 can also convert a stateful app link in order to be supported by different versions of an application or by different versions of the application framework or by different versions of the operating system. For instance, a user may save a link in a certain application of a certain version and later open the link on a device with the same application installed but with a different version. The app link resolution service 1020 can automatically verify whether the link will work on the second computing device and possibly convert the link to make it work.

In some implementations, the stateful app link resolution service 1020 performs a number of functions. First, the stateful app link resolution service 1020 provides a registration function. The registration function registers a link containing all the parameters needed to open the saved application state and returns a unique identifier for the link. For example, the stateful app link resolution service 1020 can receive a request to register a stateful app link from a computing device (e.g., computing device 1020) including the parameters for the link (e.g., page launcher parameters), and in return send a unique identifier for the stateful link back to the computing device. Second, the stateful app link resolution service 1020 provides a resolution function. The resolution function receives a unique identifier for a given link and returns the parameters registered for the unique identifier (e.g., similar to the procedure depicted at 1040). In an example scenario, when a stateful app link is created (e.g., by a library or by the operating system), the link (e.g., a link-with-parameters) is registered with the stateful app link resolution service 1020 and a unique identifier (e.g., a link-with-id) is received. The unique identifier can then be stored locally or shared with others. In another example scenario, to activate (or open) a link using a unique identifier, the system uses the stateful app link resolution service 1020 to retrieve the parameters registered for the unique identifier, and then uses the parameters to return to the mobile application with the saved application state.

Developer Experience

An application developer can use the technologies described herein to generate stateful app links to content and features of the application to be leveraged by other app developers. The developer can generate links, in the same way users generate links, and then associate semantics (e.g., title, description, etc.) with the links. Such links can be published externally to be invoked by other application developers. For instance, the developer of application A can expose a set of links which the developer of application B can invoke to redirect users from application B to application A. Application A could be an application for making restaurant reservations and application B could be an application for searching for restaurants. The developer of application A can expose stateful app links with almost no developer effort.

Computing Systems

Figure 11:
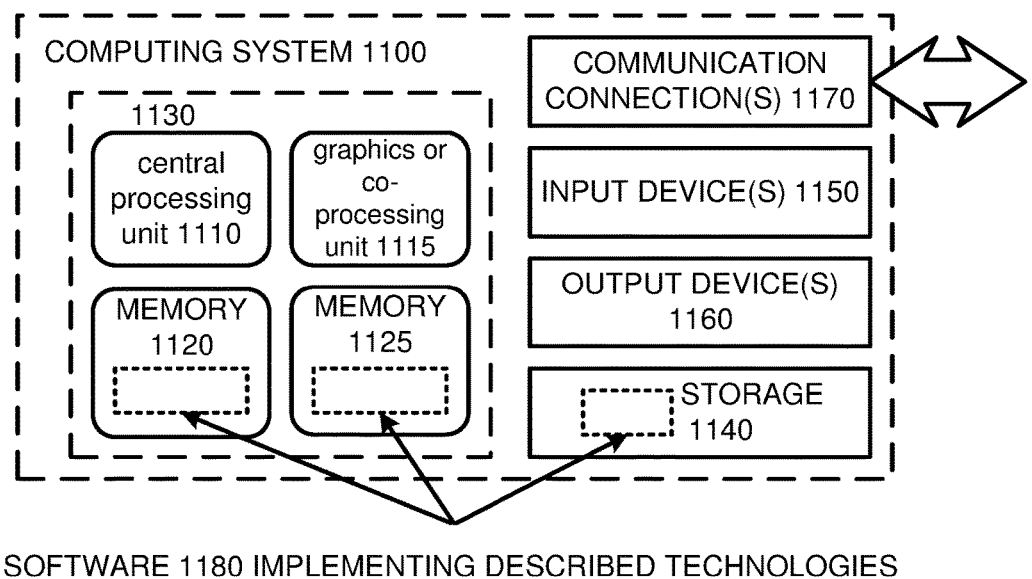
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), nonvolatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 12:
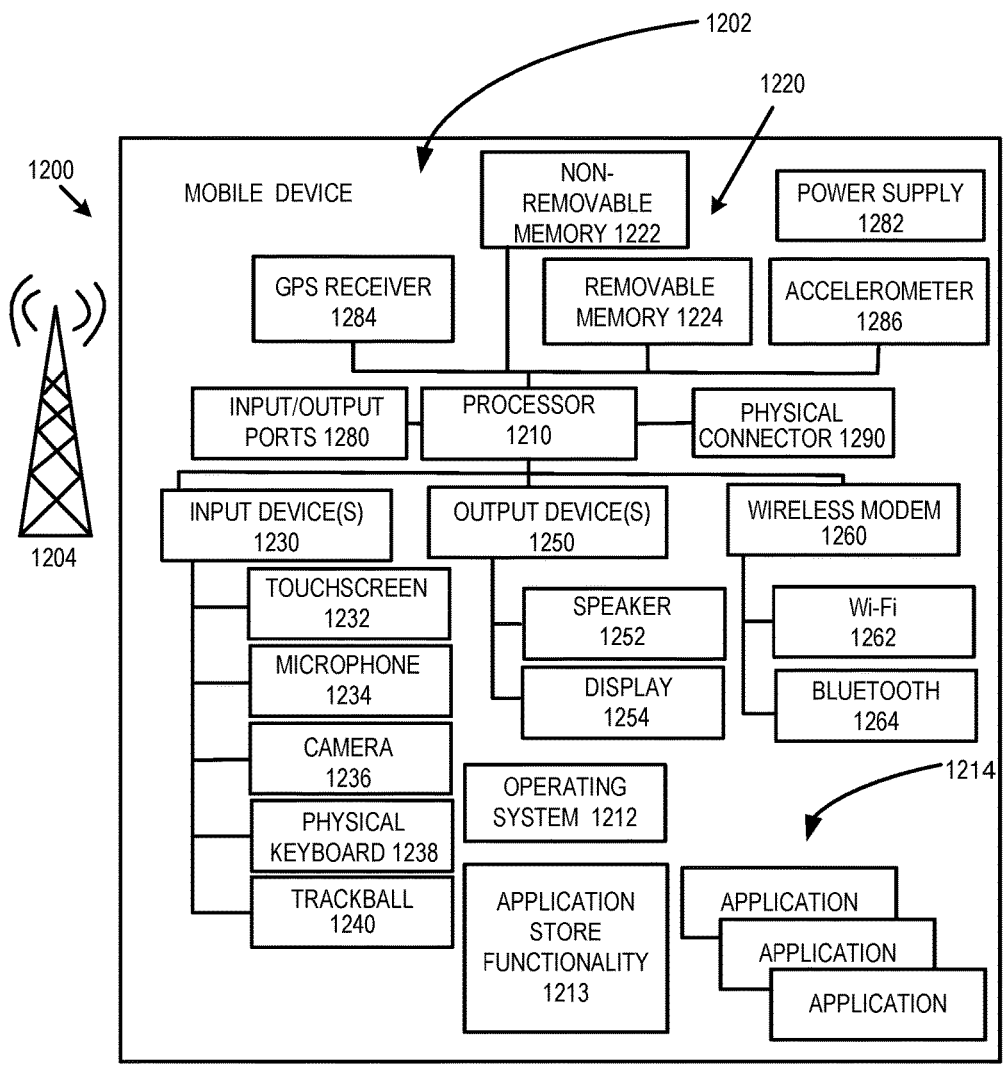
FIG. 12 is an example mobile device that can be used in conjunction with the technologies described herein.

FIG. 12 is a system diagram depicting an example mobile device 1200 including a variety of optional hardware and software components, shown generally at 1202. Any components 1202 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1204, such as a cellular, satellite, or other network.

The illustrated mobile device 1200 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The application programs can include common mobile computing applications (e.g., email applications, calendars, contact managers, web browsers, messaging applications), or any other computing application. Functionality 1213 for accessing an application store can also be used for acquiring and updating application programs 1214.

The illustrated mobile device 1200 can include memory 1220. Memory 1220 can include non-removable memory 1222 and/or removable memory 1224. The non-removable memory 1222 can include RAM, ROM, flash memory, a hard disk, or other well-known memory storage technologies. The removable memory 1224 can include flash memory or a Subscriber Identity Module (SIM) card, which is well known in GSM communication systems, or other well-known memory storage technologies, such as "smart cards." The memory 1220 can be used for storing data and/or code for running the operating system 1212 and the applications 1214. Example data can include web pages, text, images, sound files, video data, or other data sets to be sent to and/or received from one or more network servers or other devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1200 can support one or more input devices 1230, such as a touchscreen 1232, microphone 1234, camera 1236, physical keyboard 1238 and/or trackball 1240 and one or more output devices 1250, such as a speaker 1252 and a display 1254. Other possible output devices (not shown) can include piezoelectric or other haptic output devices. Some devices can serve more than one input/output function. For example, touchscreen 1232 and display 1254 can be combined in a single input/output device.

The input devices 1230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1212 or applications 1214 can comprise speech-recognition software as part of a voice user interface that allows a user to operate the device 1200 via voice commands. Further, the device 1200 can comprise input devices and software that allows for user interaction via a user's spatial gestures, such as detecting and interpreting gestures to provide input to a gaming application.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth 1264 or Wi-Fi 1262). The wireless modem 1260 is typically configured for communication with one or more cellular networks, such as a GSM network for data and voice communications within a single cellular network, between cellular networks, or between the mobile device and a public switched telephone network (PSTN).

The mobile device can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components 1202 are not required or all-inclusive, as any components can be deleted and other components can be added.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. By way of example and with reference to FIG. 12, computer-readable storage media include memory and storage 1220, 1222, and 1224. The term computer-readable storage media does not include signals and carrier waves. In addition, the term computer-readable storage media does not include communication connections, such as 1170, 1260, 1262, and 1264.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
    a processing unit; and
    memory;
    the computing device configured, via computer-executable instructions, to perform operations for validating stateful app links for mobile applications, the operations comprising:
        maintaining a log of events triggered by a mobile application, the events associated with selected event handlers of the mobile application;
        receiving a request to dynamically generate a stateful app link to a current page of the mobile application, wherein the stateful app link represents a saved application state of the mobile application; and
        responsive to determining that the log contains an event associated with the current page that has a dependency on a resource external to the mobile application, outputting an indication of the dependency.

2. The computing device of claim 1 the operations further comprising:
    determining whether any of the events from the log that are associated with the current page are dependent on one or more of file system resources, database resources, sensor resources, or external resources accessed via a network.

3. The computing device of claim 1 wherein outputting the indication of the dependency comprises outputting an alert indicating that the saved application state of the mobile application may not be fully recovered when the link is activated later.

4. The computing device of claim 1 wherein outputting the indication of the dependency comprises saving the indication of the dependency in association with the stateful app link.

5. The computing device of claim 1 wherein the stateful app link is generated for a default view of the current page.

6. The computing device of claim 1 wherein the stateful app link is generated for a current view, other than a default view, of the current page.

7. The computing device of claim 1 wherein the resource is a file system resource, a database resource, or an external resource accessed via a network.

8. The computing device of claim 1 wherein the resource is a sensor resource.

9. The computing device of claim 1 wherein the selected event handlers of the mobile application are those event handlers of the mobile application that access file system resources, database resources, sensor resources, or an external resource accessed via a network.

10. The computing device of claim 9 wherein the selected event handlers are determined using static and dynamic analysis of the mobile application.

11. The computing device of claim 1 the operations further comprising:
receiving a request to share the stateful app link; and
denying the request to share the stateful app link due to the dependency on the resource external to the mobile application.

12. A method, implemented by a computing device, for validating stateful app links for mobile applications, the method comprising:
maintaining a log of events triggered by a mobile application, the events associated with selected event handlers of the mobile application, and data communicated between different runtime states of the mobile application;
receiving a request to dynamically generate a stateful app link to a current view of a current page of the mobile application, wherein the stateful app link represents a saved application state of the mobile application;
determining whether any of the events from the log that are associated with the current page are dependent on external resources, wherein the external resources are one or more of file system resources, database resources, sensor resources, or external resources accessed via a network; and
when the log contains events dependent on external resources, outputting an indication of the dependency.

13. The method of claim 12 wherein outputting the indication of the dependency comprises presenting an alert to the user indicating that the saved application state of the mobile application may not be fully recovered when the link is activated later.

14. The method of claim 12 wherein the current view is not a default view of the current page.

15. The method of claim 12 wherein the selected event handlers of the mobile application are those event handlers of the mobile application that access file system resources, database resources, sensor resources, or external resources accessed via a network.

16. A computer-readable storage device storing computer-executable instructions for execution on a computing device to perform operations for validating stateful app links for mobile applications, the operations comprising:
receiving a request to dynamically generate a stateful app link to a current view of a current page of the mobile application, wherein the stateful app link represents a saved application state of the mobile application;
in response to the request, creating the stateful app link to the current view of the current page;
performing validation on the stateful app link in response to a request to share the stateful app link; and
upon successful validation, sharing the stateful app link.

17. The computer-readable storage device of claim 16, wherein performing the validation comprises determining whether the stateful app link will change security or privacy settings of the mobile application or computing device.

18. The computer-readable storage device of claim 16 wherein performing the validation comprises determining whether the stateful app link contains private information and whether sharing is permitted.

19. The computer-readable storage device of claim 16 wherein performing the validation comprises determining whether a mobile application version associated with the stateful app link is compatible with a target version of the mobile application.

20. The computer-readable storage device of claim 16 the operations further comprising:
upon unsuccessful validation, denying the request to share the stateful app link.

* * * * *